United States Patent [19]

McGowan et al.

[11] Patent Number: 4,775,163

[45] Date of Patent: Oct. 4, 1988

[54] MOTORCYCLE

[75] Inventors: Thomas D. McGowan, Milwaukee; Steven W. Wentworth, Greenfield, both of Wis.

[73] Assignee: Harley-Davidson, Inc., Milwaukee, Wis.

[21] Appl. No.: 78,201

[22] Filed: Jul. 27, 1987

[51] Int. Cl.⁴ ........................ B65K 25/24; F16G 25/04
[52] U.S. Cl. .................................. 280/277; 384/192; 384/265
[58] Field of Search ................ 280/277, 275; 384/192, 384/264, 265

[56] References Cited

U.S. PATENT DOCUMENTS 4,184,695  1/1980  Roe et al. ............................ 280/277
4,211,454  7/1980  Mitchell et al. ...................... 384/192

Primary Examiner—John A. Pekar
Attorney, Agent, or Firm—C. Thomas Sylke; John C. Cooper, III; Fred Wiviott

[57] ABSTRACT

A motorcycle has a frame, a front wheel and Y-shaped rockers attached to the axle of the front wheel on either side. Also attached to each rocker is a rigid fork which directly connects the rocker to the frame of the motorcycle and a springed fork which connects the rocker to shock absorbing means which are likewise mounted on the rigid fork. The springed fork is mounted to the rocker intermediate the points at which the rigid fork and axle are mounted to the rocker. The rigid fork is attached to the rocker using an adjustable, split spherical bearing which is attached and held to the rigid fork by a stud. This bearing arrangement engages a pair of bearing races which are held in two prongs of the Y-shaped rocker. Similarly, the springed fork has a stud passing therethrough which also holds a spherical bearing. The bearing engages a bearing race which is held within the rocker.

A brake caliper is pivotably mounted to the axle of the front wheel and has its top end connected to the rigid fork of the motorcycle by a reaction link. The reaction link is oriented so that when a downward force is applied along the rigid fork, the reaction link and brake caliper act to induce a force upward resisting the downward force. This configuration increases the effective resistance of the shock absorbing system of the motorcycle and provides for additional suspension during heavy braking of the motorcycle.

29 Claims, 3 Drawing Sheets

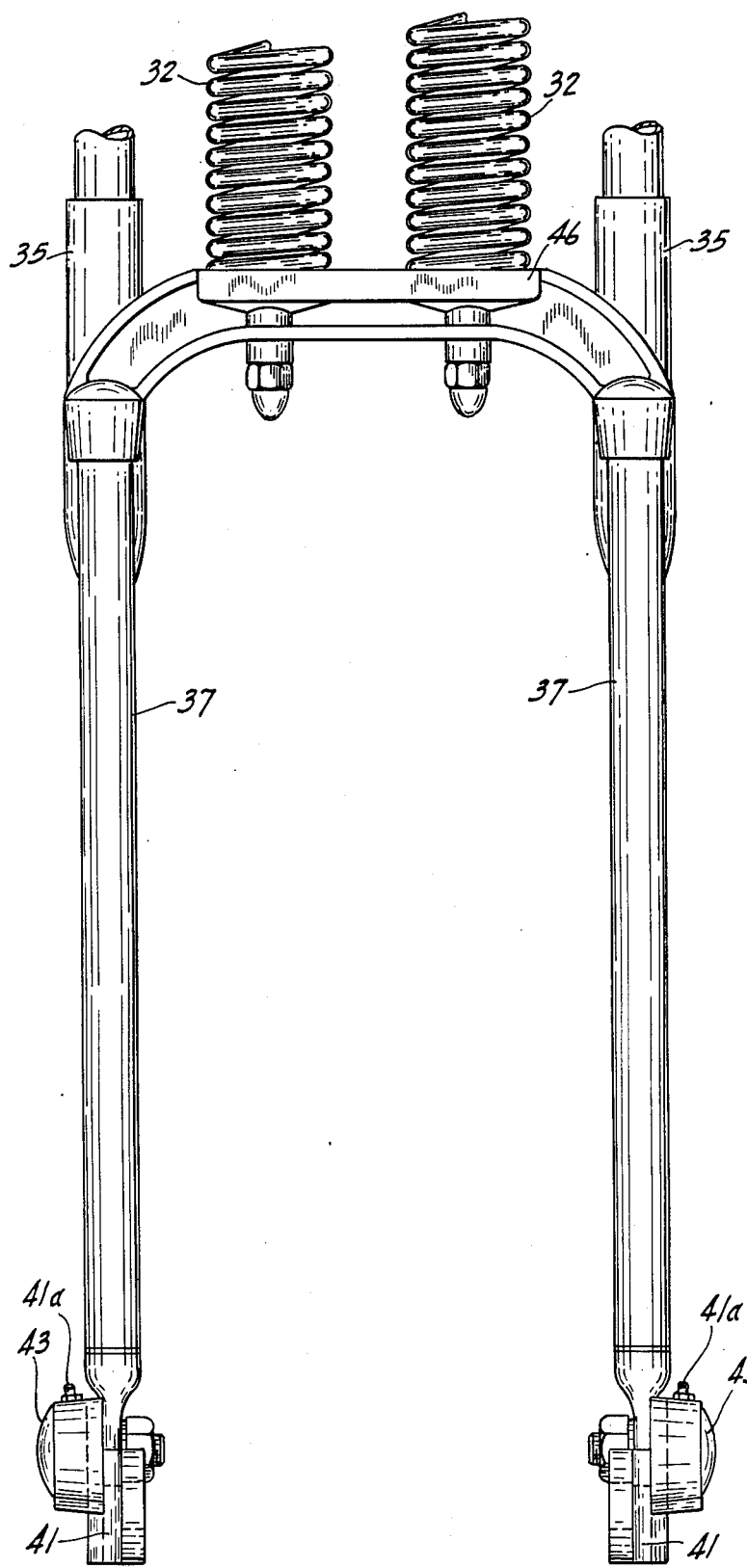
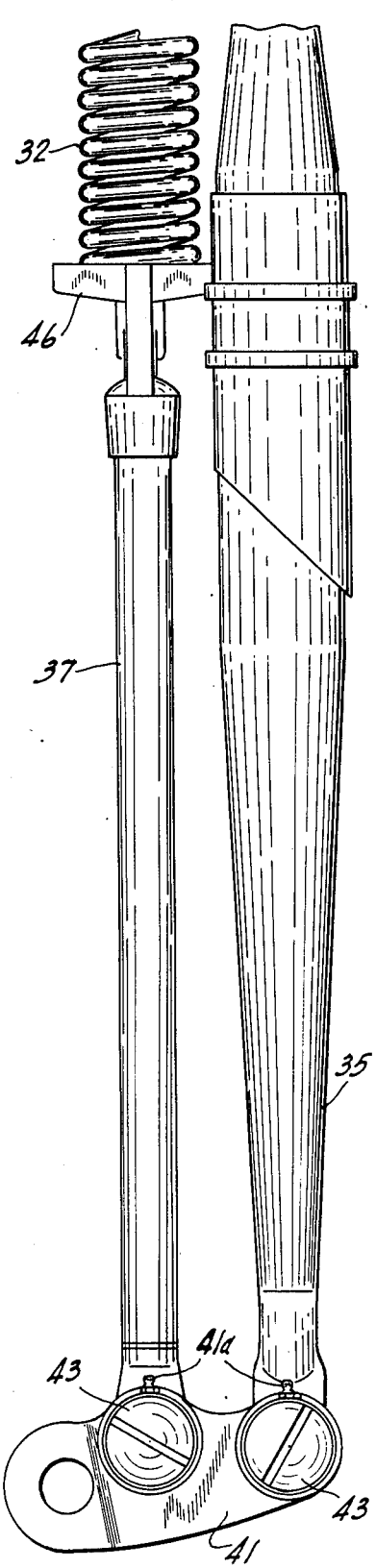
Fig. 2 PRIOR ART
Fig. 1 PRIOR ART

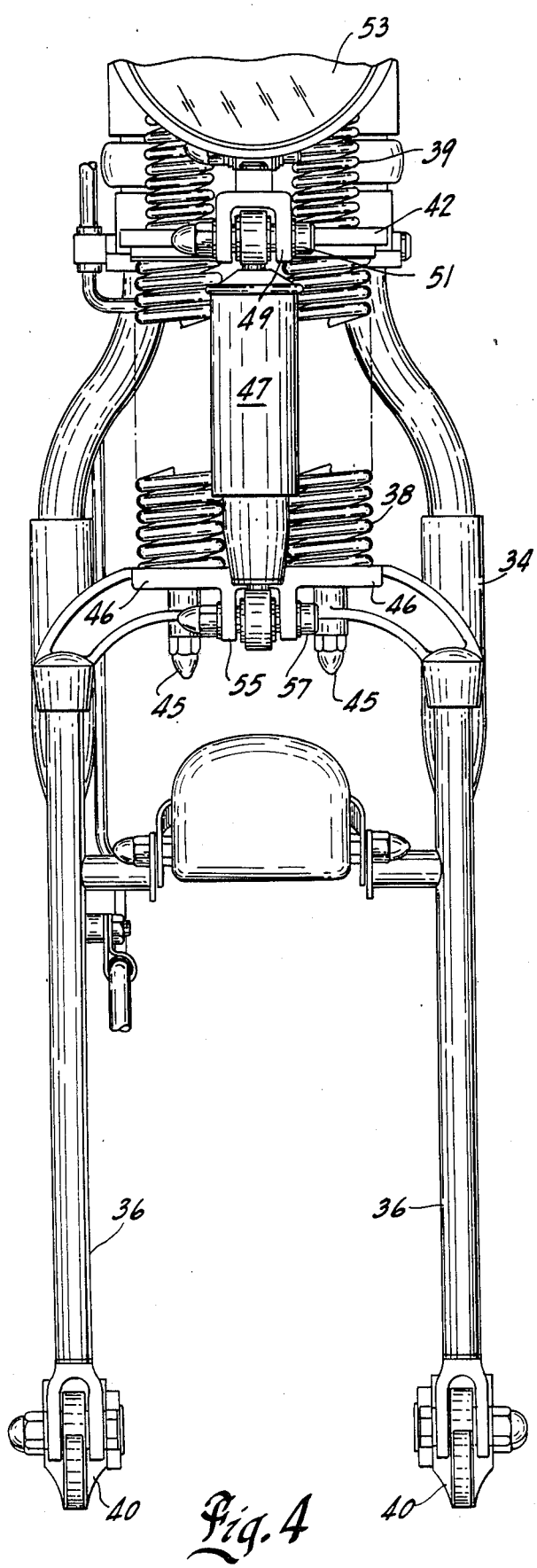
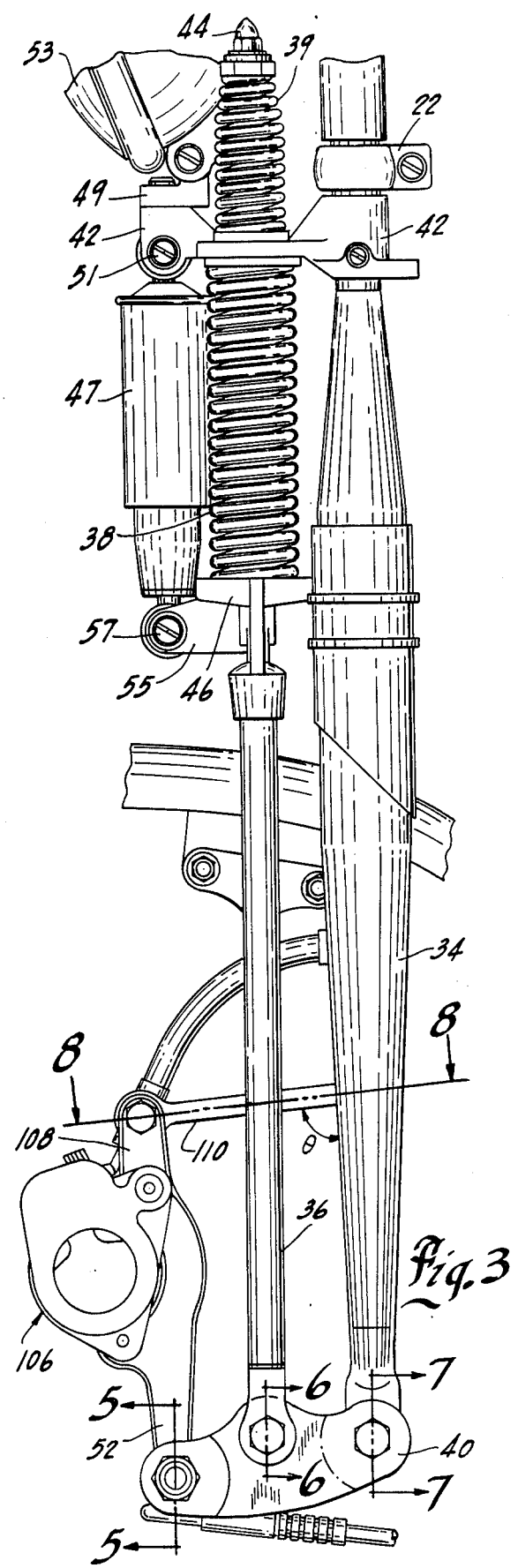

MOTORCYCLE

BACKGROUND OF THE INVENTION

1. Field of the Invention

The present invention relates generally to motorcyles; and, more particularly, the invention relates to the forward mounted wheel on a motorcycle and the suspension and braking system used in connection therewith.

2. Description of the Related Art

Harley-Davidson Motor Co. of Milwaukee, Wis. introduced a "springer" motorcycle in the early 1900's. As seen in FIG. 1, this early generation springer had a suspension system which utilized an elongate rocker 41 (with grease fittings 41a) secured to the front wheel axle. Also secured to the rocker 41 were a rigid fork 35 and a springed fork 37. Shock absorbing springs 32 were mounted adjacent the handlebars and were designed to minimize shocks from bumps or holes of a road surface on which the cycle was driven.

The front wheel rocker suspension system suffered from several shortcomings. First, as seen in FIG. 2, the rocker 41 was mounted to the forks with single-shear studs 43 and bushings which were subjected to heavy wear. As these elements wore, a certain amount of clearance developed between the elements, thereby allowing several degrees of freedom in rotational movement and a deterioration of comfort and handling. This in turn created even more wear. As a result, these parts had to be periodically replaced.

A second shortcoming of the early generation springer's suspension system was that, while the shock absorbing springs 32 took the "jolts" out of the ride, the ride was nevertheless "bouncy" due to the springs 32. Driving over rough roads would create a very bouncy ride. Similarly, it was not uncommon for the suspension to "bottom out", that is, reach the maximum shock absorption limit of the springs 32, with considerably less force applied to the suspension system than would be desirable.

Finally, a bottoming out problem also would arise when the cycle was stopped quickly. The forward momentum of cycle and rider would drive the handlebars and front suspension forks forward and downward, thereby eliminating shock absorbing capability after the suspension had bottomed out. In the present invention, the suspension and brake mechanisms work in concert to reduce that problem.

Because the springer type motorcycle possesses several very advantageous performance attributes, applicant has sought to improve it. The suspension system incorporated is considerably more sensitive to smaller bumps and irregularities of the road as compared to suspension systems in motorcycles which use telescoping fork legs on either side of the wheel between the axle and the frame. This is because the hydraulic cylinder and piston are pulled slightly out of alignment due to the vertical pull of gravity and therefore the edge of the piston rubs against the inner surface of the cylinder.

OBJECTS AND SUMMARY OF THE INVENTION

It is a primary object of the present invention to provide a front wheel suspension and braking system for a motorcycle which reduces wear, frequency of part replacement and maintenance on parts of the system.

It is another object of the present invention to provide a suspension and brake system for a motorcycle which provides an anti-dive feature when an operator is braking the motorcycle.

It is a different object of the present invention to provide a suspension and brake system for a motorcycle which permits an effective increase in the resistance of the suspension system during braking.

It is still a different object of the present invention to provide a motorcycle suspension system which is adjustable so that as wear occurs, the suspension may be easily adjusted to maintain desired control and handling characteristics without having to replace parts.

How these and other objects and advantages of the present invention are accomplished will become apparent to one of ordinary skill in the art after reading the following description of the preferred embodiment in conjuction with the FIGURES. Generally, however, the objects are accomplished in a motorcycle having a frame and a front wheel. Y-shaped rockers are attached to the axle of the front wheel on either side. Also attached to each rocker is a rigid fork which directly connects the rocker to the frame of the motorcycle and a springed fork which connects the rocker to shock absorbing means which are likewise mounted on the rigid fork. The springed fork is mounted to the rocker intermediate the points at which the rigid fork and axle are mounted to the rocker. The rigid fork is attached to the rocker using a split spherical bearing which is attached and held to the rigid fork by a stud. This bearing arrangement engages a pair of bearing races which are held in two prongs of the Y-shaped rocker. The bearing configuration is arranged so that as the bearing and race wear, the joint may be easily tightened, thereby providing the rider with a like-new fit and handling of the motorcycle throughout the life of the rocker assembly. Similarly, a clevis at the bottom of each tine of the springed fork has a stud passing therethrough which also holds a spherical bearing. The bearing engages a bearing race which is held within the rocker.

A brake caliper is also pivotably mounted to the support for the front wheel and has its top end connected to the rigid fork of the motorcycle by a reaction link. The reaction link is oriented so that when a downward force is applied along the rigid fork, the reaction link and brake caliper act to induce a force upward resisting the downward force. This configuration increases the effective resistance of the shock absorbing system of the motorcycle and provides for additional suspension during heavy braking of the motorcycle. While other modifications and additions may become obvious to one of ordinary skill in the art, the scope of the invention is to be defined solely by the claims which follow the description of the preferred embodiment.

DESCRIPTION OF THE DRAWINGS

FIG. 1 is a side view of the front suspension system of a prior art motorcycle;

FIG. 2 is a front view of the suspension system of FIG. 1;

FIG. 3 is a side view of the improved front suspension system of the present invention as incorporated into a motorcycle;

FIG. 4 is a front view of the front suspension system of FIG. 3;

DESCRIPTION OF THE PREFERRED EMBODIMENT

Figure 5:
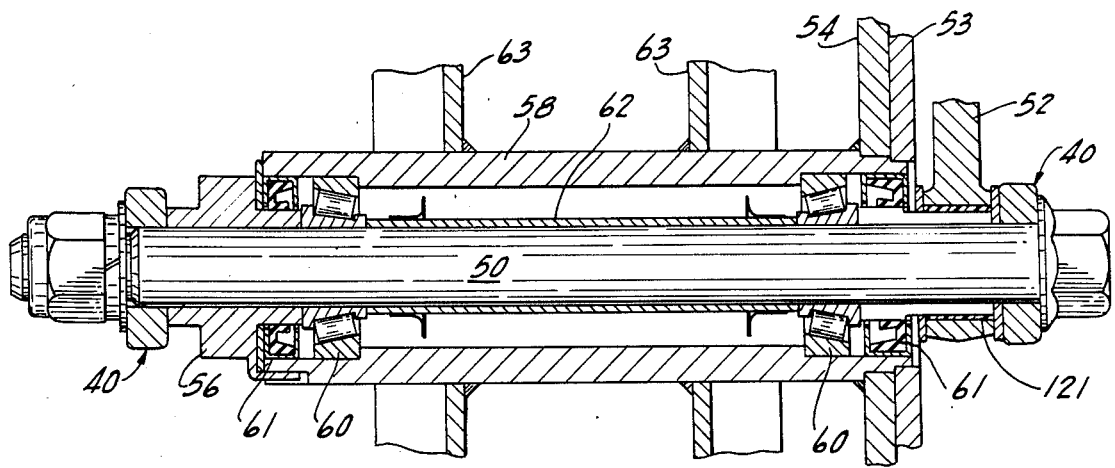
FIG. 5 is a cross-sectional view of the rocker and axle mounting of the front end suspension system at FIG. 3, taken along the line 5—5 of FIG. 3.

An earlier generation of the motorcycle suspension system is shown in FIGS. 1 and 2. Reviewing more closely the prior art rockers 41 and their mounting to forks 35 and 37 in FIGS. 1 and 2, single-shear studs 43 using internal bushings (not shown) and grease fittings 41a were used to secure the forks 35 and 37 to rocker 41. As noted above, this configuration has caused considerable cost and inconvenience to owners of these vehicles and hampered handling and ride comfort. The new forked suspension system provides the connection between the main frame 22 of the motorcycle and the front wheel (not shown), as seen in FIGS. 3 and 4.

Suspension System

The suspension system uses a rigid fork 34, a springed fork 36, shock absorbing springs 38 and 39 and a rocker 40. The rocker 40 is elongate and has a front end which is mounted to the axle of the front wheel. The lower end of rigid fork 34 is pivotably attached to the rear end of rocker 40 and the upper end of fork 34 is firmly secured to the frame 22 of the motorcycle.

Also attached to the rigid fork 34 is a brace 42 which holds lower springs 38 and upper springs 39. These springs operate in a manner to be described below. The upper end of springed fork 36 is attached to springs 38 and the lower end of fork 36 is pivotably attached to the rocker 40 intermediate its ends.

In addition to springs 38 and 39, a hydraulic damping cylinder 47 is provided to reduce the bounce caused by the springs 38 and 39. Cylinder 47 is secured at the top to brace 42 by a bracket 49 and a bolt 51. Also attached to bracket 49 is a headlight 53. The lower end of cylinder 47 is held by bolt 57 in a second bracket 55 secured to springed fork 36 adjacent retainers 46.

The front suspension system uses the rocker 40 as a lever arm for absorbing shocks experienced by the front wheel. Lower springs 38 compress due to shocks caused by elevated irregularities, such as bumps in a road, when the axle is displaced upwardly. Similarly, upper springs 39 compress due to shocks from depressed irregularities, such as potholes, when the front axle is displaced downwardly. Brace 42 provides the stationary base for the springs which are held in aligned contact therewith by an internal rod (not shown) and nuts 44 and 45. Lower nuts 45 also hold retainers 46 in contact with lower springs 38, retainers 46 being upper parts of the springed fork 36. As in the prior art device shown in FIGS. 1 and 2, springs 38 and 39 may further comprise internal springs (not shown) which help stabilize suspension and increase shock absorbing resistance. Cylinder 47 also aids in reducing bounciness caused by a rough driving surface.

As seen in FIG. 5, wheel hub 58 is rotatably held against axle 50 by a pair of tapered roller bearings 60. Bearings 60 are held apart by a bearing spacer 62 which surrounds axle 50 and are sealed with oil seals 61. Radially outside of the spacer 62 is the wheel hub 58 to which are welded flanges 63 which hold the wheel's spokes (not shown). Also welded to hub 58 is a flange 54 having a brake disc 53 mounted thereon.

Axially outside of the hub 58 on one side is a speedometer drive 56. On the other side, adjacent the brake disc 53, the brake caliper 106 is mounted to axle 50 with mounting arm 52. A lining 121 made of a synthetic non-stick resin allows arm 52 to rotate about axle 50. On the outer end of axle 50 on each side, rockers 40 are securely mounted.

Figure 6:
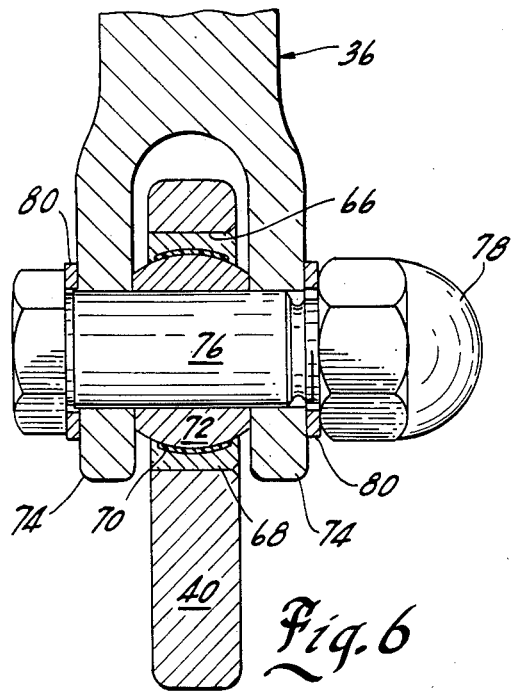
FIG. 6 is a cross-sectional view of the springed fork mounting to the rocker, taken along the line 6—6 of FIG. 3.

The mounting for springed fork 36 incorporates new elements that significantly reduce wear and assist in redistributing loads more effectively. FIG. 6 illustrates this new springed fork mounting. Rocker 40 includes a hole 66 into which a bearing race 68 is mounted. Race 68 has an inner surface 70 made of a synthetic non-stick resin in the preferred embodiment. Spherical bearing 72 is free to move in all three degrees of rotational motion within race 68. The lower end of springed fork 36 forms a clevis having two prongs 74 which straddle rocker 40. A pivot stud 76 passes through prongs 74 and spherical bearing 72 and is held in place by acorn nut 78 and washers 80. As FIG. 6 illustrates, although limited, this mounting still permits all three degrees of rotational freedom. Additionally, loads on stud 76 are distributed across a larger surface area and the single-shear, cantilevered structure of the prior art which proved so troublesome, has been replaced with a balanced, double-shear configuration which improves load distribution.

Figure 7:
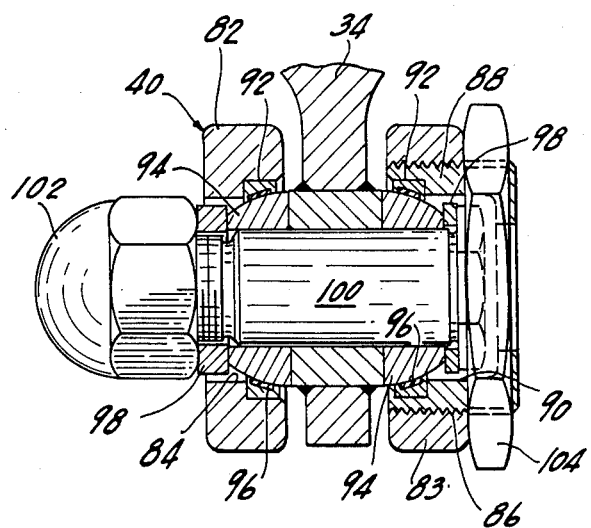
FIG. 7 is a cross-sectional view of the mounting of rigid fork to the rocker, taken along the line 7—7 of FIG. 3.

FIG. 7 shows the new mounting configuration for pivotably attaching the rigid fork 34 to the rear end of each rocker 40. As opposed to the clevis on fork 36, rigid fork 34 is unitary, while rocker 40 splits into prongs 82 and 83. Prong 82 has a stepped hole 84, the purpose of which will be explained below. The other prong 83 has a threaded hole 86. Secured in hole 86 is a bearing retainer 88 which has external threading and an internal stepped structure 90 symetrically identical to steps 84. Held within the larger diameter segments of stepped holes 84 and 90 are bearing races 92. Each race 92 is actually one half of race 68 from the central springed fork mounting. Likewise, two semi-spherical bearings 94, each being one half of spherical bearing 72, ride in layers 96 of races 92. In the preferred embodiment, layers 96 are made of a synthetic non-stick resin. Rigid fork 34 and bearings 94 are compressed between washers 98 by pivot stud 100 and acorn nut 102. In the preferred embodiment, retainer 88 encloses the head of stud 100.

A jam nut 104 is screwed onto the external threading of bearing retainer 88. The entire rigid fork mounting assembly is therefore secure. While some wear will naturally occur, this can be easily compensated for by loosening jam nut 104, tightening bearing retainer 88 and then retightening jam nut 104.

This configuration eliminates the unbalanced, cantilevered structure which caused ride and handling problems in the prior art device. Loads on these elements are now more evenly distributed by the double-shear stud and bearing configuration. The separation between rotational centers of bearings 94 also limits movement of the rigid fork 34 to only one degree of rotational freedom. Because axle 50 allows no relative motion between axle and rockers, the entire rocker 40 is limited to one rotational degree of freedom.

It is apparent from the above description of the preferred embodiment of the suspension system that the pivoting joint disclosed herein has applications which extend far beyond the motorcycle art. Joints which require pivoting or rotational motion of some type which are currently constructed with other elements, e.g. a single-shear stud and bushing, could be replaced by a pivoting joint using the disclosed double-shear stud and bearing configuration. Such configuration provides the double-shear uniformity missing in the cantilevered, single-shear structure seen in some devices. The new configuration likewise provides this double-shear uniformity with considerably less volume than was required by earlier structures. Likewise, the new pivoting joint configuration is adjustable for wear. That is, as the joint wears, it may be adjusted by tightening, thereby providing a consistently firm fit throughout the life of the joint. Such a joint can be applied to any device which requires pivoting of an element through a single degree of rotation or an element which rotates completely about a central axis or hub.

Brake System

A brake system incorporating an anti-dive feature is integrally related to the new suspension system disclosed above. FIG. 3 shows a disc brake caliper 106 designed to engage disc 53 on the front wheel. As seen in FIG. 5, the lower mounting arm 52 of caliper 106 is pivotably secured to the axle 50 on bushing 121, which is preferably made of a synthetic non-stick resin, at about the same point as the front end of rocker 40. The upper mounting arm 108 of caliper 106 is pivotably linked to rigid fork 34 by a brake reaction link 110.

Figure 8:
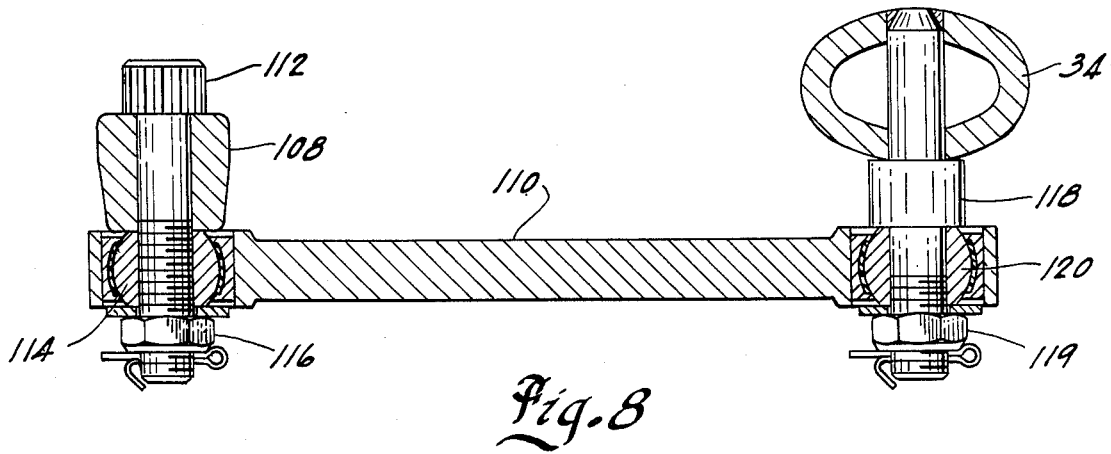
FIG. 8 is a cross-sectional view of the mounting of the brake reaction link, taken along the line 8—8 of FIG. 3.

FIG. 8 shows the mounting configuration of link 110. The upper caliper arm 108 is firmly held on bolt 112 along with a bearing 114 by nut 116. Like the mounting between springed fork 36 and bearing 72, a lined bearing race 122 engages spherical bearing 114. The lining 124 is a non-stick synthetic resin held within race 122. Race 122 is held within a hole 126 in like 110. Link 110 is therefore free to rotate about bolt 112. Similarly, spacer pin 118 and nut 119 hold a second bearing 120 in spaced relation to rigid fork 34. Again, the link 110 is free to rotate about an axis in pin 118 parallel to that of bolt 112.

This mounting configuration for brake caliper 106 provides some unique and extremely beneficial operational characteristics. The brake configuration of FIG. 3 approximates a linked and flexible parallelogram having as its sides a segment of rigid fork 34, rocker 40, caliper bracket 106 and link 110. The angle 0 between fork 34 and link 110 varies depending on the compression of springs 38 and 39. When the front brake is applied, momentum drives forks 34 and 36 downward, and in extreme cases causes maximum compression of spring 38 thereby effectively eliminating front suspension during heavy braking.

In the present invention, however, link 110 is mounted so as to resist and retard this bottoming out of the suspension. As 0 increases, link 110 induces a force up the fork 34, thereby increasing the effective resistance of the suspension. That is, when the front brake is applied, the reaction force restraining the caliper actually assists in maintaining suspension and retarding any "diving" of the motorcycle's front end.

It should be obvious to one skilled in the art after reading the present specification that a wide variety of modifications can be made to the suspension and brake system described herein. Accordingly, the present invention is not to be limited by the description or illustration of the preferred embodiment, but is to be limited solely by the scope of the claims which follow.

What is claimed is:

1. A motorcycle having a frame, said motorcycle comprising:
    (1) a front wheel having an axle; and
    (2) means for attaching each end of said axle to said frame, said axle attaching means comprising:
        (a) a Y-shaped rocker on each end of said axle, each of said rockers having a first end mounted to said axle and a second end;
        (b) said second end of each of said rockers having first and second prongs and being pivotably mounted by a first spherical bearing means to a rigid fork secured to said frame;
        (c) a springed fork having two tines each pivotably mounted by a second spherical bearing apparatus to one of said rockers intermediate said first and second ends, said springed fork being attached to shock absorbing means secured to said rigid fork; and
        (d) wherein said first spherical bearing apparatus comprises a first stud passing through said prongs of said rocker and said rigid fork, said first stud and said rigid fork having a first bearing attached about said rigid fork and between said prongs, said first bearing engaging a first bearing race assembly in said prongs of said rocker.

2. The motorcycle as recited in claim 1 wherein said first bearing comprises first and second hemispherical bearing elements, one of each said elements being held on each side of said rigid fork by said first stud between a head on one end of said stud and a nut attached to the other end of said stud.

3. The motorcycle as recited in claim 2 wherein said first bearing race assembly in said prongs of said rocker comprises a first race held within said first prong and rotatably engaging said first bearing element and a second race held within a bearing retainer, wherein said second race engages said second bearing element, and where said bearing retainer is adjustably secured within said second prong of said rocker by locking means.

4. The motorcycle as recited in claim 3 wherein said bearing retainer is externally threaded and is screwable into said second prong of said rocker and said locking means for securing said bearing retainer is a jam nut screwed onto said bearing retainer thereby preventing said retainer from moving within said second prong and such that, when said bearing retainer is secured, said rigid fork may only be rotated about an axis defined by the longitudinal axis of said first stud.

5. The motorcycle as recited in claim 4 wherein said springed fork has two tines each terminating at their lower end with a clevis, each rocker being held within each said clevis of said springed fork by a second stud passing through said clevis and said rocker, said second stud and said clevis of said springed fork holding a second bearing which engages a second bearing race assembly held within said rocker.

6. The motorcycle as recited in claim 5 wherein said second bearing is generally spherical and permits multi-directional rotation of said springed fork relative to said second stud.

7. The motorcycle as recited in claim 6 wherein said shock absorbing means includes a plurality of springs mounted between said springed fork and said rigid fork, said springs designed to absorb energy when said springed fork is displaced vertically relative to said rigid fork.

8. The motorcycle as recited in claim 7 wherein said shock absorbing means further includes a hydraulic damping cylinder designed to damp the extension and compression of said springs when said springs are absorbing and releasing energy.

9. A motorcycle having a frame, said motorcycle comrrising:
(1) a front wheel having an axle; and
(2) means for attaching each end of said axle to said frame, said axle attaching means comprising:
 (a) a Y-shaped rocker on each end of said axle, each of said rockers having a first end mounted to said axle and a second end;
 (b) a rigid fork secured to said frame and mounted to each of said rockers by a first stud passing through first and second prongs of said rocker and said rigid fork, said first stud and said rigid fork having a first bearing attached thereto, said first bearing engaging a first bearing race assembly in said prongs of said rocker;
 (c) a springed fork having two tines each terminating at their lower end with a clevis, each rocker being pivotably held intermediate said first and second ends of said rocker within each said clevis of said springed fork by a second stud passing through said clevis and said rocker, said second stud and said clevis of said springed fork holding a spherical second bearing which engages a second bearing race assembly held within said rocker, said springed fork being attached to shock absorbing means secured to said rigid fork.

10. The motorcycle as recited in claim 9 wherein said first bearing comprises first and second semi-spherical bearing elements, one of each said elements being held on each side of said rigid fork by said first stud between a head on one end of said stud and a nut attached to the other end of said stud.

11. The motorcycle as recited in claim 10 wherein said first bearing race assembly in said prongs of said rocker comprises a first race held within said first prong and rotatably engaging said first bearing element and a second race held within a bearing retainer, wherein said second race engages said second bearing element, and wherein said bearing retainer is adjustably secured within said second prong of said rocker by locking means.

12. The motorcycle as recited in claim 11 wherein said bearing retainer is externally threaded and is screwable into said second prong of said rocker and said locking means for securing said bearing retainer is a jam nut screwed onto said bearing retainer thereby preventing said retainer from moving within said second prong and such that when said bearing retainer is secured, said rigid fork may only be rotated about an axis defined by the longitudinal axis of said first stud.

13. The motorcycle as recited in claim 12 wherein said shock absorbing means includes a plurality of springs mounted between said springed fork and said rigid fork, said springs designed to absorb energy when said springed fork is displaced vertically relative to said rigid fork.

14. The motorcycle as recited in claim 13 wherein said shock absorbing means further includes a hydraulic damping cylinder designed to damp the extension and compression of said springs when said springs are absorbing and releasing energy.

15. A motorcycle having a frame, said motorcycle comprising:
(1) a front wheel having a axle; and
(2) means for attaching each end of said axle to said frame, each of said axle attaching means comprising:
 (a) a Y-shaped rocker having a first end and a second end, said first end being mounted to said axle;
 (b) said second end having two prongs mounted to a rigid fork secured to said frame and being pivotable about a first axis;
 (c) a springed fork pivotably mounted to said rocker intermediate said first and second ends, said springed fork being attached to shock absorbing means secured to said rigid fork; and
 (d) a brake disc mounted coaxially to said front wheel and a brake caliper having a lower end mounted to said axle and pivotable about a second axis therewith, said second axis being parallel to said axle, and an upper end mounted to said rigid fork by reaction link means designed to increase the effective resistance of said shock absorbing means under braking conditions.

16. The motorcycle as recited in claim 15 wherein said reaction link means is an elongate brace with a first end connected to the upper end of said brake caliper and pivotable about a third axis therewith, and a second end connected to said rigid fork and pivotable about a fourth axis at a point intermediate said rocker and said frame.

17. The motorcycle as recited in claim 16 wherein said axle, said first axis, said second axis, said third axis and said fourth axis are all parallel.

18. The motorcycle as recited in claim 17 wherein said shock absorbing means includes a plurality of springs mounted between said springed fork and said rigid fork, said springs designed to absorb energy when said springed fork is displaced vertically relative to said rigid fork.

19. The motorcycle as recited in claim 18 wherein said shock absorbing means further includes a hydraulic damping cylinder designed to damp the extension and compression of said springs when said springs are absorbing and releasing energy.

20. A motorcycle having a frame, said motorcycle comprising:
(1) a front wheel having an axle; and
(2) means for attaching each end of said axle to said frame, each of said axle attaching means comprising:
 (a) a Y-shaped rocker having a first end and a second end, said first end being mounted to said axle;
 (b) said second end of each said rocker having first and second prongs mounted by a first spherical bearing apparatus to a rigid fork secured to said frame and being pivotable about a first axis;
 (c) a springed fork having two tines each pivotably mounted by a second spherical bearing apparatus to one of said rockers intermediate said first and second ends, said springed fork being attached to shock absorbing means secured to said rigid fork; and
 (d) a brake disc mounted coaxially to said front wheel and a brake caliper having a lower end mounted to said axle and pivotable about a second axis therewith, said second axis being parallel to said axle, and an upper end mounted to said rigid fork by reaction link means designed to increase the effective resistance of said shock absorbing means under braking conditions.

21. The motorcycle as recited in claim 20 wherein said reaction link means is an elongate brace with a first end connected to the upper end of said brake caliper and pivotable about a third axis therewith, and a second end connected to said rigid fork and pivotable about a fourth axis at a point intermediate said rocker and said frame.

22. The motorcycle as recited in claim 21 wherein said axle, said first axis, said second axis, said third axis and said fourth axis are all parallel.

23. The motorcycle as recited in claim 22 wherein said springed fork has two tines each terminating at their lower end with a clevis, each rocker being held within each said clevis of said springed fork by a second stud passing through said clevis and said rocker, said second stud and said clevis of said springed fork holding a second bearing which engages a second bearing race assembly held within said rocker.

24. The motorcycle as recited in claim 23 wherein second bearing is generally spherical and permits multi-directional rotation of said springed fork relative to said second stud.

25. The motorcycle as recited in claim 24 wherein said shock absorbing means includes a plurality of springs mounted between said springed fork and said rigid fork, said springs designed to absorb energy when said springed fork is displaced vertically relative to said rigid fork.

26. The motorcycle as recited in claim 25 wherein said shock absorbing means further includes a hydraulic damping cylinde designed to damp the extension and compression of said springs when said springs are absorbing and releasing energy.

27. A system for rotatably mounting a third member between a first member and a second member, said system comprising:
 a bearing race assembly held within said first and second members;
 a stud passing through and between said first and second members and said bearing race assembly, wherein said stud holds a bearing apparauts within said bearing race assembly and holds said third member firmly within said bearing apparatus,
 wherein said bearing apparatus comprises first and second hemispherical bearing elements, one of each said elements being held on each side of said third member by said stud between a head on one end of said stud and a nut attached to the other end of said stud.

28. The system as recited in claim 27 wherein said bearing race assembly comprises a first race held within said first member and rotatably engaging said first bearing element and a second race held within a bearing retainer, wherein said second race engages said second bearing element, and wherein said bearing retainer is adjustably secured within said second member by locking means.

29. The system as recited in claim 28 wherein said bearing retainer is externally threaded and is screwable into said second member and said locking means for securing said bearing retainer is a jam nut screwed onto said bearing retainer thereby preventing said retainer from moving within said second member and such that when said bearing retainer is secured, said third member may only be rotated about an axis defined by the longitudinal axis of said stud.

* * * * *